G. D. HOUSTON.
THREE HORSE DROP EVENER.
APPLICATION FILED SEPT. 24, 1917.
1,280,736.
Patented Oct. 8, 1918.
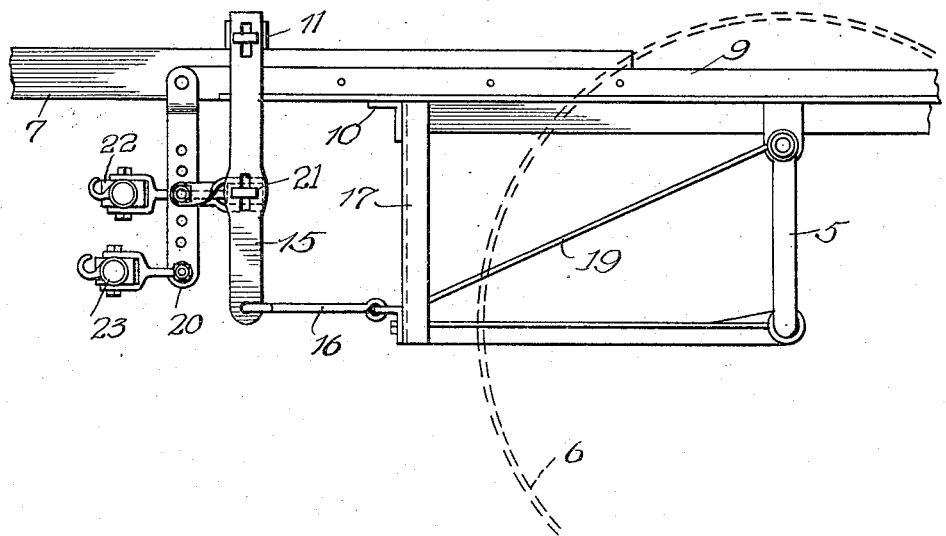
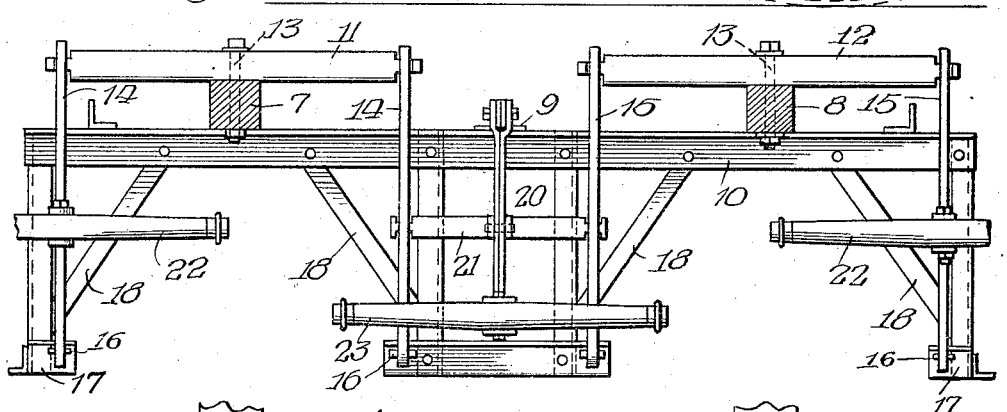
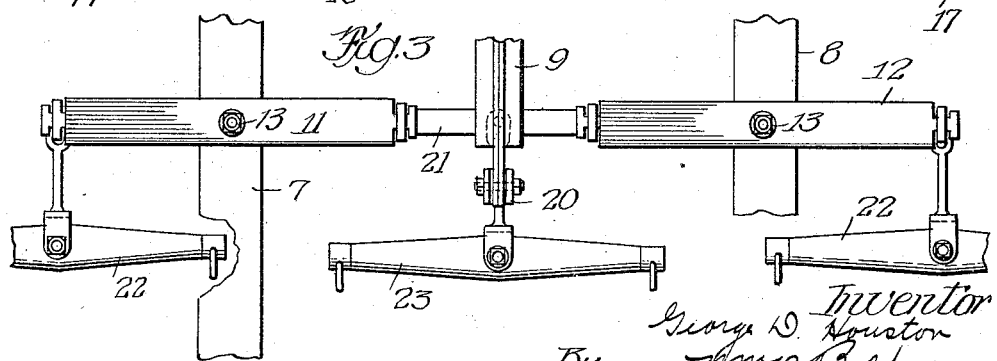

UNITED STATES PATENT OFFICE.

GEORGE D. HOUSTON, OF RUSHVILLE, ILLINOIS.

THREE-HORSE DROP-EVENER.

1,280,736.                Specification of Letters Patent.        Patented Oct. 8, 1918.

Application filed September 24, 1917.  Serial No. 192,877.

*To all whom it may concern:*

Be it known that I, GEORGE D. HOUSTON, a citizen of the United States, residing at Rushville, in the county of Schuyler and State of Illinois, whose post-office address is in said city, prays that Letters Patent may be granted to him for the Improvements in Three-Horse Drop-Eveners, as set forth in the annexed specification.

My invention relates to a three horse drop evener for two row cultivators and has for its object the provision of an evener whereby a full third of the load is transferred to the center horse thus requiring him to do his proportionate share of the work.

Further objects and advantages of my invention will be apparent as it is better understood by reference to the following specification when read in connection with the accompanying drawing illustrating the preferred embodiment thereof, in which—

Figure 1 is a side elevation of a cultivator illustrating the application of my invention;

Fig. 2 is a vertical section through the structure illustrated in Fig. 1, and

Fig. 3 is an enlarged plan view of a portion of the structure.

Referring to the drawing 5 indicates the cultivator frame supported on wheels 6 and provided with two tongues 7 and 8 and a center post 9 connected by a transverse member 10 of the cultivator frame. The details of the frame construction form no part of my present invention and need not therefore be more fully described, my invention being applicable to well known cultivators now in common use.

Two swivel bars 11 and 12 are pivotally connected by bolts 13 to the tongues 7 and 8. Levers 14 and 15 are connected at their upper ends to the ends of the swivel bars 11 and 12 respectively. The lower ends of the levers 14 and 15 are connected by links 16 to brackets 17 depending from the transverse member 10 and rigidly connected to the cultivator frame by braces 18 and 19.

A depending lever 20 is pivotally connected at its upper end to the center post 9. Somewhat below the medial point of the lever 20 a cross bar 21 connects it with the adjacent levers 14 and 15.

Swingle trees 22 are connected to the outer levers 14 and 15 substantially midway of their length. A swingle tree 23 is connected to the lower end of the lever 20. Thus it will be seen that I have provided means for attaching three horses to the evener, the outer horses drawing on the swingle trees 22 while the center horse draws on the swingle tree 23. The pulling forces are transferred to the cultivator frame through the links 16 and by reason of the connection of the adjacent levers 14 and 15 to the lever 20 below the medial point thereof the work is so divided that the center horse is required to carry a full third of the load and therefore to do his share of the work.

While various forms of eveners have been heretofore suggested and many are in common use I am not aware that any evener has been heretofore devised which successfully divides the load for three horses as does the evener described herein. Not only is the load evenly divided by my invention but the forces exerted are transferred to the cultivator frame in such a manner as to maintain it in proper alinement and reduce the labor required to a minimum.

Various changes may be made in the form, construction and arrangement of the parts without departing from the spirit and scope of the invention or sacrificing any of its material advantages, the form hereinbefore described being merely a preferred embodiment thereof.

I claim:

1. In a three horse drop evener the combination of a frame, three swingle trees and connections between said swingle trees and frame including two pairs of vertically disposed levers and an intermediate vertically disposed lever, adjacent levers of said pairs being connected to said intermediate lever below the medial point of the latter and said swingle trees being connected respectively to the outermost levers of said pairs and to said intermediate lever.

2. In a three horse drop evener the combination of a frame, three swingle trees and connections between said swingle trees and frame including two swivel bars connected to said frame, two pairs of vertically disposed levers connected at opposite ends to said swivel bars and to said frame and an intermediate vertically disposed lever, adjacent levers of said pairs being connected to said intermediate lever below the medial point of the latter, and said swingle trees being connected to the outermost levers of said pairs and to said intermediate lever.

3. In a three horse drop evener the combination of a frame having two parallel tongues and a center pole, swivel bars on said tongues each supporting a pair of depending levers, links connecting the lower ends of said levers to said frame, a lever depending from said center pole and connected by a cross bar to adjacent levers of said pairs, and swingle trees connected to the outermost levers of said pairs and to the lower end of said intermediate lever.

GEO. D. HOUSTON.

Witnesses:
KATE B. BAGBY,
WASH HALL.